United States Patent
Nacman et al.

(10) Patent No.: US 7,852,531 B2
(45) Date of Patent: Dec. 14, 2010

(54) DIGITAL CORRECTION FOR ALIGNMENT OF A PLURALITY OF COLOR CHANNELS OF A COLOR IMAGE FORMING DEVICE

(75) Inventors: Aron Nacman, Rochester, NY (US); John Adam Handwork, Calcleamas, OR (US); Theresa M. Marconi, Penfield, NY (US); Xing Li, Webster, NY (US); Peter D. McCandlish, Rochester, NY (US); Gregory B. Marshall, Canby, OR (US)

(73) Assignee: Xerox Corporation, Norwalk, CT (US)

( * ) Notice: Subject to any disclaimer, the term of this patent is extended or adjusted under 35 U.S.C. 154(b) by 421 days.

(21) Appl. No.: 11/954,841

(22) Filed: Dec. 12, 2007

(65) Prior Publication Data

US 2009/0154804 A1    Jun. 18, 2009

(51) Int. Cl.
*G03F 3/08* (2006.01)
*G06F 15/00* (2006.01)
*H04N 1/36* (2006.01)
*G06K 9/00* (2006.01)

(52) U.S. Cl. ............. 358/518; 358/1.9; 358/409; 382/167

(58) Field of Classification Search ............... 358/1.9, 358/518, 523, 524, 539, 409, 410, 412, 3.22; 382/167, 166, 165, 162
See application file for complete search history.

(56) References Cited

U.S. PATENT DOCUMENTS

| | | | | |
|---|---|---|---|---|
| 5,659,634 | A * | 8/1997 | Yeh et al. | 382/232 |
| 6,121,993 | A * | 9/2000 | Maekawara et al. | 347/236 |
| 6,437,829 | B1 * | 8/2002 | Webb et al. | 348/476 |
| 7,034,858 | B2 * | 4/2006 | Oba et al. | 347/237 |
| 7,609,245 | B2 * | 10/2009 | Kasai | 345/89 |
| 7,627,161 | B2 * | 12/2009 | Shimizu et al. | 382/135 |
| 7,672,019 | B2 * | 3/2010 | Misaka | 358/3.27 |
| 2006/0169900 | A1 * | 8/2006 | Noji et al. | 250/310 |
| 2007/0053022 | A1 * | 3/2007 | Misaka | 358/518 |
| 2008/0055393 | A1 * | 3/2008 | Westerfield et al. | 347/259 |
| 2008/0117234 | A1 * | 5/2008 | Yajima et al. | 345/690 |

* cited by examiner

*Primary Examiner*—Madeleine A Nguyen
(74) *Attorney, Agent, or Firm*—Oliff & Berridge, PLC (57) ABSTRACT

A system and method are provided for digital correction of a plurality of color channels and color image data. In color reproduction, a color image may be composed of a plurality of superimposed color channels in a color space. In order to assure the proper alignment of color channels and exemplary applications such as color printing, one or more of the plurality of color channels which compose a complete color image may be scaled to an output resolution, and corrected in order to ensure proper alignment and authentic reproduction of a color image. In place of a plurality of independent clocks, one for each channel, a single clock is provided for every channel, and additional unit is supplied to scale each channel according to independent characteristics.

4 Claims, 4 Drawing Sheets

DIGITAL CORRECTION FOR ALIGNMENT OF A PLURALITY OF COLOR CHANNELS OF A COLOR IMAGE FORMING DEVICE

BACKGROUND

This disclosure is directed to systems and methods of digital scaling and correction of a plurality of color channels in a multicolor image forming device.

Printers, copiers, and other types of image forming devices have become necessary productivity tools for producing and/or reproducing documents. Such image forming devices include, but are not limited to, desktop copiers, stand alone copiers, facsimile machines, photographic copiers, laser printers and copiers, and multifunction devices which may comprise one or more of the above devices and other like systems capable of producing, and/or reproducing image data from an original document, data file or the like. During the image reproduction process, it is known in systems such as the ones listed above, to divide a color image into a plurality of images to simplify processing. These plurality of images, when recombined, may reproduce the original image. As is known, an image may be divided into a plurality of images, in accordance with a multicolor color space. Such a color space may define a plurality of colors, that when combined in varying amounts, are able to produce a wider variety and number of colors than the number of the colors in the color space. In this way, a relatively small number of component images, or color channels, where each color channel represents a color image drawn with preferably, but not limited to, one color channel representing one of the plurality of colors defined by a color space, may be provided to reproduce a relatively large number of colors.

For example, as in known in paper color image reproduction, a color space defined by four component colors, comprising cyan, magenta, yellow and black may be used n order to reproduce full color images. This color space may be referred to as CMYK, and may provide full color reproduction of images. Each full color image may, in turn, be divided into four colors channels, as discussed above, where each color channel may be associated with one of the four colors channels C, M, Y, and K comprising the CMYK color space.

Because a full color image may be separated into color channels, errors may occur during the reproduction process. Specifically, alignment of all of the color channels must be maintained in order to properly reproduce the image. If color channels are not aligned, a final reproduced color image may appear to have incorrect colors when superimposed, or may cause the "ghosting" of images, where one or more color channels are visibly displaced from other color channels.

SUMMARY

Related methods of correcting simple errors, specifically with respect to properly scaling a plurality of color channels with respect to each other, include providing circuitry to individually scale each of the plurality of color channels. More specifically, related art methods and systems of achieving the above correction in certain laser printer applications involve applying a unique timing signal to each color channel provided by a plurality of clock signal generating units, where each clock signal generating units provides a different clock signal frequency to its respective color channel scaling and correction unit, in order to compensate for laser characteristics which may van, between lasers in an image forming device. Further, each laser in a laser color image forming device may be operatively assigned to one of a plurality of color channels within a color space.

In turn, a separate laser may be provided for each color channel to control that color channel individually. However, these lasers may have different performance characteristics, where the different performance characteristics may affect the output of an image in a printing application. These differing characteristics may cause images to improperly align, resulting in an inaccurate reproduction of color image data.

Providing a timing circuit, such as a phase-locked loop individually to each color channel may offset the inconsistencies between channels, thereby allowing all channels to be properly aligned. However, providing a timing circuit, such as a phase-locked loop, for each of a plurality of color channels may cause electromagnetic interference in a scaling and correction system, as well as increase cost and complexity in components in order to scale and correct an image.

Therefore, it is desired to provide a system and method for digital scaling and correction of a plurality of color channels which reduces the amount of electromagnetic interference and the amount of timing circuitry. Systems and methods of the current disclosure describe scaling and correction for a plurality of color channels while also providing a single timing circuit.

A drawback with conventional methods and systems associated with image forming devices is the electromagnetic interference and duplication of timing hardware associated with providing a dedicated timing circuit (with only slightly varying timing parameters) to each and every laser in the image forming device. Additionally, by requiring such an arrangement, an unnecessary duplication of hardware occurs, increasing cost and bulk of hardware required to implement the accurate reproduction of full color images.

It would be advantageous, in view of the above-identified shortfalls, to provide methods and systems, within or related to one or more image forming devices, that would allow the scaling and correction of a plurality of color channels of color image data, while providing a single timing unit, thereby reducing electromagnetic interference, bulk and cost, among other advantages.

Additionally, it would be beneficial to provide a plurality of scaling and correction units, each associated with a single channel of color channel data. Each channel of color channel data, as discussed above, may be associated with one of a plurality of color channels in a color space, such as, but not limited to one of C, M, Y, or K channels in a CMYK color space. Each scaling unit, working in conjunction with a single timing clock, may modify color channel data by reading source color channel pixels, which may be digital representations of color channel data provided to the system of an image forming device to cause proper alignment of all color channels. By using a single timing clock, providing a substantially identical timing signal may be provided to each scaling and correction unit.

In certain embodiments, fractions of pixels, or subpixels, are added or subtracted from a sequence of pixels in a scan direction, such as a horizontal line of color image data, to stretch or shrink a horizontal line of image data. A scan direction may be any scan direction in an image reproduction device which operates in a given dimension or direction, such as, but not limited to a horizontal line. A scan direction may also include curves, splines or other directions or dimensions used in image reproduction as is known, or may be developed in the future. By removing a predetermined number of subpixels from a line that should be contracted, or conversely, adding a predetermined number of subpixels to a line that should be extended, proper alignment of color channel data may be achieved across a scan direction.

The systems and methods according to this disclosure may distribute these additions or subtractions, or more generally corrections, evenly across the length of a scan direction. To achieve this increased even distribution, each sequence of pixels in a scan direction, or in an exemplary horizontal line of image data, may be divided into a predetermined number of sections, each section being of a substantially equal number of pixels. Once these sections are created, one correction is performed for each section, thereby distributing the potential error, and minimizing visible misalignment that may occur when a large portion of corrections are made within a close distance of each other, causing a highly localized expansion or contraction of image data. In certain embodiments, the actual placement of the correction may be random to prevent visible artifacts.

The systems and methods according to this disclosure may provide addition or subtraction of subpixels in a sequence of pixels in a scan direction, such as a line of image data. In each sequence of pixels from source color channel data, a first resolution may be expanded to a second higher resolution, or concurrently when an addition or subtraction correction is to be made. This way, in addition to even distribution of corrections as described above, visual inconsistencies may be further reduced by adding or subtracting pixels at a second resolution. Since pixels at a higher resolution are added and subtracted from image data at a first low resolution, the pixels at a higher resolution may in fact be treated as subpixels, or partial pixels at a source resolution.

The systems and methods according to this disclosure may provide a plurality of scaling and correction units, which may each include a scaling and correction main unit to scale and correct color channel pixels to be properly aligned with color channel pixels of other, associated, color channels of a color space.

The systems and methods according to this disclosure may also provide a plurality of scaling and correction units, which may each further include a shift register, to convert external signals into a format compatible with signals input to and output from the scaling and correction unit, a section index unit to indicate a section, or subdivision, in a sequence of color channel pixels, a position index unit to indicate a position, or location, within a section, a correction index unit to indicate a position within a section where a correction is to be made, such as an addition correction or a subtraction correction as described, and a compare index unit to indicate that a position corresponds to a position where a correction is required.

The systems and methods according to this disclosure may provide a single timing clock operatively connected to a plurality of scaling and correction units.

The systems and methods according to this disclosure may provide a controller interface which may provide input parameters to a plurality of scaling and correction units.

The systems and methods according to this disclosure may provide a timing unit which may include a scan signal converter unit, to convert scan signals into a format compatible with a plurality of scaling and correction units, a First-In, First-Out ("FIFO") buffer and a parallel-to-serial converter, to convert source color channel pixels into a format compatible with a plurality of scaling and correction units.

The systems and methods according to this disclosure may provide a synchronization unit which may include a timing signal generator, parallel output registers, and parallel-to-serial converters, to convert external signals into a format compatible with signals input to and output from the system.

These and other features and advantages of the disclosed embodiments are described in, or apparent from, the following detailed description of various exemplary embodiments.

BRIEF DESCRIPTION OF THE DRAWINGS

Various exemplary embodiments and disclosed systems and methods will be described, in detail, with reference to the following figures, wherein.

DETAILED DESCRIPTION OF EMBODIMENTS

The following description of various exemplary embodiments and systems and methods for digital scaling and correction of a plurality of color channels may refer to a plurality of images, each image comprising a different color channel, that when superimposed form an image with a greater number of colors than a sum of the plurality of color channels such as, but not limited to, color spaces used to reproduce full color images. These color spaces may refer to additive color channels, such as, but not limited to, CMYK channels used in the printing of digital images, as are known in the art. However, the subject matter of this disclosure is riot limited to any specific type of color space, any specific number of color channels in a color space, or any other restriction on characteristics of color channels or color spaces as are known or may be known. For example, known color spaces exemplified by, but not limited to, RGB and L*a*b* may be digitally scaled and corrected by the systems and methods of this disclosure.

Source color channels and source color control signals, as depicted, outlined and/or discussed below, may include, but are not limited to, digital image reproduction and manipulation devices such as digital computing devices, laser printer devices, or the like. The devices receiving scaled and corrected color channel data may also at least comprise devices as exemplified above.

Figure 1:
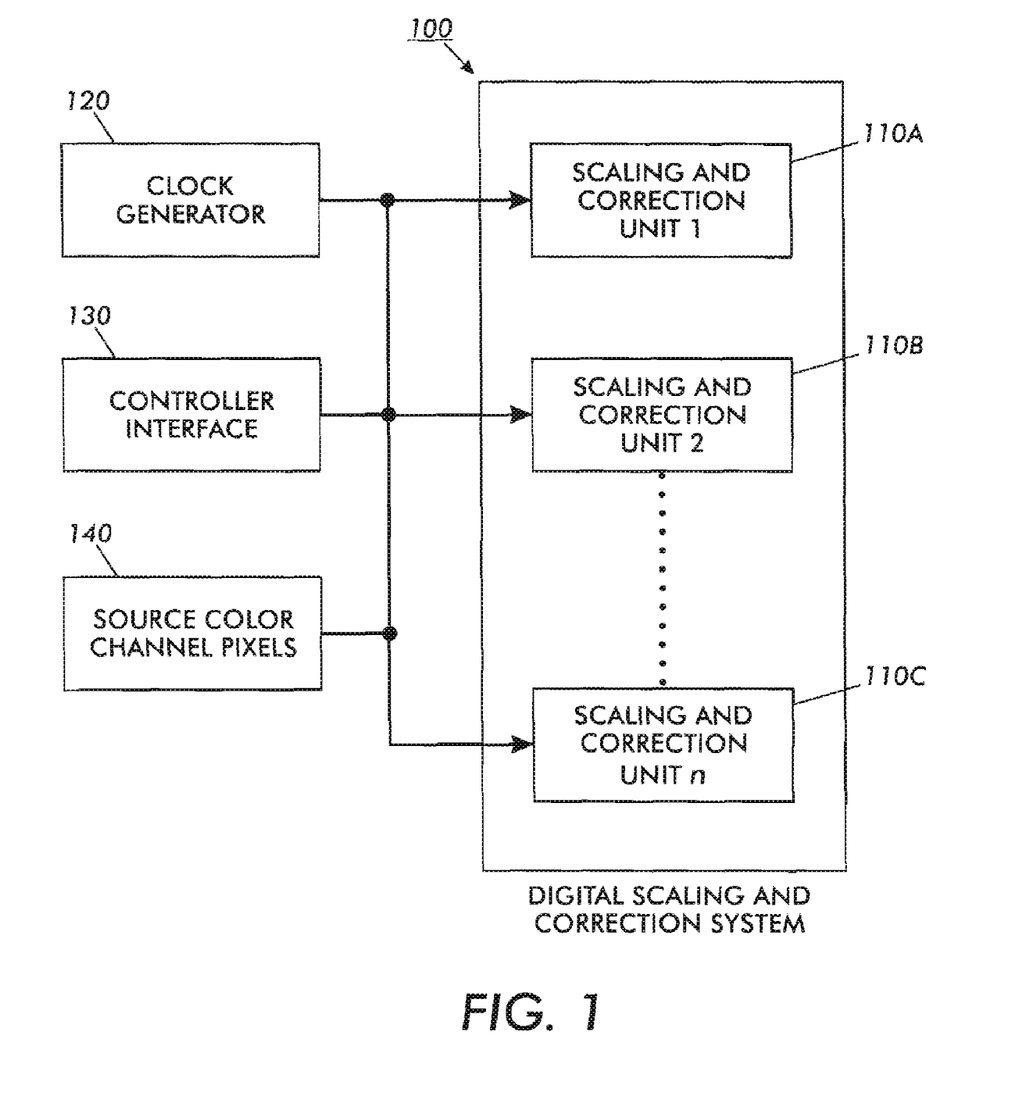
FIG. 1 illustrates a block diagram of an exemplary system for digital scaling and correction of a plurality of color channels.

FIG. 1 illustrates a block diagram of an exemplary system 100 for digital scaling and correction of a plurality of color channels;

A digital scaling and correction system 100 may accommodate an arbitrary number of source color channel pixels 140, representing all pixels of a color image, and divided into pixels each associated with a single color channel as described above, to be digitally scaled and corrected. A corresponding number of scaled color channels is generated for each of the source color channels, respectively, after digital scaling and correction. Each source color channel is operatively connected to a scaling and correction unit 110A, 110B or 110C, which generates the scaled and corrected color channels. It should be appreciated that the number of source color channels and their corresponding scaling and correction units may vary based on the number of source color channels provided to the system, which may, in turn, be based on the number of color channels in a source color space.

In the case that the data of source color channel pixels 140 is synchronous, source color channel synchronization signals may be provided. The signals may comprise, but are not limited to, scan synchronization signals such as horizontal synchronization ("H sync"), as a start of scan signal ("SOS"), such as may be used in printing devices to indicate the beginning of a new line. Additionally, another scan synchronization signal may also be provided, such as a vertical synchronization ("V sync"), as may be used in digital printing devices which may indicate the beginning of a new page.

The digital scaling and correction system 100 is operable to perform scaling and correction on a plurality of source color channels comprising source color channel pixels 140 by using a single scaling clock generator for each of the plurality of scaling and correction units 110A, 110B and 110C. In certain embodiments, the scaling signal may be modified from an external clock signal at a different, higher frequency by a clock generator such as, for example, a phase-locked loop 120. In this way, a single phase-locked loop, or the like, may provide properly timed and independent scaling and correction of all scaling and correction units 110A, 110B and 110C.

In order to successfully realize the scaling and correction of multiple source color channels while using a single substantially identical clock signal for every scaling and correction unit 110A, 110B and 110C, at least one controller interface 130 may provide source color scaling and correction parameters to each scaling and correction unit 110A, 110B and 110C. Each controller interface 130 may provide a plurality of scaling and correction parameters in order to successfully scale and correct a wide range of source color channel data. Exemplary scaling and correction parameters 132 may include, but are not limited to, (1) a parameter to define the number of corrections to be made, (2) a parameter to define the input resolution of source color channel data, (3) a parameter to determine whether a scaling correction will expand or contract a source color channel, and (4) a parameter to determine where an addition or subtraction correction may occur. Additionally, parameters may be added in order to increase functionality of capability of the scaling and correction units associated with each source color channel. Conversely, the controller interface may omit one or more of the parameters discussed above. These omitted parameters may be directly provided by another source or device, or may not be required by an embodiment.

A digital scaling and correction system 100 may also provide a timing signal clock generator 120, which may generate a pixel clock frequency or a second clock frequency operating at a different frequency from a scaling unit clock. For example, this pixel clock may be used for timing each scaling and correction unit associated with a source color channel. Additionally, the system may include, but is not limited to, an output buffer for each of the scaled and corrected color channels that are produced by the system, before being output to an external device. Such output buffers may include parallel to serial converters, or vice versa, or the like, and parallel or serial registers, or the like. These buffers may be arranged as is known.

Figure 2:
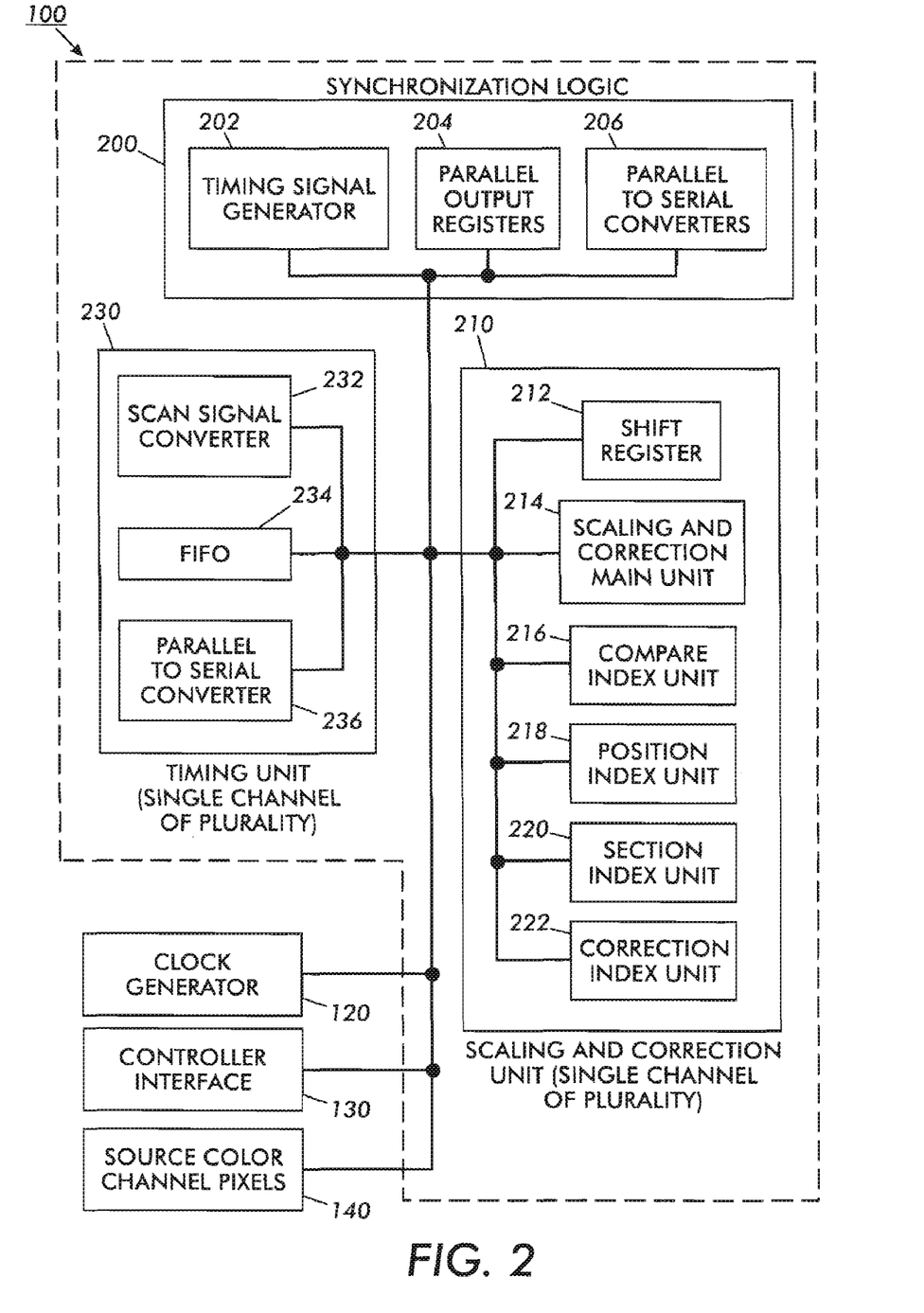
FIG. 2 illustrates a block diagram of a second exemplary system for digital scaling and correction of a plurality of color channels including synchronization and timing units.

FIG. 2 illustrates a block diagram of a second exemplary system for digital scaling and correction of a plurality of color channels including synchronization and timing units.

A second exemplary system for digital scaling and correction may include additional timing and synchronization units. A synchronization unit 200 may include a timing signal generator 202 to generate a second clock frequency from a scaling clock frequency and a start of scan sync signal ("SOS sync") from an external start of scan signal, which may comprise one of a plurality of source color channel synchronization signals. The synchronization unit 200 may also include parallel output registers 204 to buffer scaled and corrected color channel pixels for each color channel, and parallel to serial converters 206 to convert buffered parallel scaled and corrected color channel pixels into serial scaled and corrected color channel pixels. This synchronization unit 200 may provide common inputs to and outputs from each timing unit 230 and scaling and correction unit 210 in the system. A plurality of scaling and correction unit outputs may be assembled by the synchronization unit 200 for post-processing and output.

The timing signal generator 202 may generate a second timing signal, such as a pixel clock, and an SOS sync, which may be synchronously coordinated with the pixel clock. The start of scan may indicate, in an exemplary embodiment, a horizontal scan direction synchronization.

Parallel output registers 204 and parallel to serial converters 206 may provide appropriate output buffering and conversion to a plurality of parallel scaled and corrected color channel pixels. The registers 204 may receive and buffer scaled and corrected color channel pixels to a scaling clock frequency from a pixel clock frequency, using a load signal which may operate at a pixel clock frequency. These buffered pixels are then received and converted by parallel to serial converters into serial scaled and corrected color channel pixels.

Further, a timing unit 230 may be included for each scaling and correction unit 210 to perform appropriate preprocessing of input signals prior to scaling and correction. The timing unit 230 may include a scan conversion unit 232 to, in exemplary embodiments, generate a page start signal from a vertical sync signal and a line start signal from an SOS sync signal. A vertical sync signal may comprise one of a plurality of source color synchronization signals. Additionally, all of the synchronization signals generated by the timing unit may be substantially coordinated with the pixel clock signal.

Source color channel pixels 140 may be synchronized and buffered by the timing unit 230 in a similar fashion to output buffering and conversion by the synchronization unit 200, and may use a source color channel clock, which may itself be one of a plurality of source color synchronization signals. In exemplary embodiments, a FIFO buffer 234 may buffer, for example, parallel source color channel pixels 140, synchronized to a source color channel clock or system clock, to parallel source color channel pixels synchronized to the pixel clock. These pixels may then be converted to serial source color channel pixels by the parallel to serial converter 236, and received by the scaling and correction unit 210.

A scaling and correction unit 210 may include a scaling and correction main unit 214, and may further include a shift register 212 for each scaling and correction unit 210. This shift register 212 may convert exemplary serial scaled and corrected color channel pixels to exemplary parallel scaled and corrected color channel pixels, which may be received by the synchronization unit 200, prior to output from the system.

Each scaling and correction unit 210 may be initialized with a plurality of scaling and correction parameters as discussed above, parameters whose characteristics, member, and type may be governed by an external device, or may include the input of a user.

The values that may be loaded into a position index unit 218, a section index unit 220, and a correction index unit 222, which may be embodied in at least one random number generator, as discussed above, will be described below. In an exemplary embodiment, a position index unit 218 may comprise a counter, a section index unit 220 may comprise an accumulator, and a correction index unit 222 comprising at least one random number generator, may further comprise a single random number generator. An accumulator may be loaded with a seed value, a random number generator may be loaded with a mask value, and a counter may be reset to a predetermined value, which may include a reset to zero.

A seed value, as may be utilized in this embodiment in order to implement a section index, indirectly determines a length and pixel of each division, or a section of a single sequence of pixels of color channel data, exemplified by a line of color channel data in a fast scan direction. One correction is provided per section in this embodiment to more evenly distribute and mitigate potentially visible errors which may occur during the scaling and correcting process.

For example, a total number of pixels in a single line or fast scan direction may be 104 pixels long, and may be scaled to 100 pixels long. To accomplish scaling to 100 pixels, four corrections sections may be required to scale the line, where four sections may be provided to perform four subtraction corrections. Therefore, a section length may be 26 pixels long, to provide four sections to a sequence of pixels 104 pixels long. An accumulator may be used to store a section index, and may incorporate a seed value which causes the accumulator to overflow at the end of every section. This overflow may comprise a control signal which may be provided to a counter and a random number generator in an exemplary embodiment, as will be discussed below. Position index unit 218, as discussed above, is used to store the current position within a section. As each pixel, or set of pixels, is scaled and corrected, the counter may record the number of pixels or sets of pixels that have been scaled and corrected by the system. After initialization, the counter may receive a control signal from the accumulator at the end of a section. This control signal may reset the counter at the beginning of each section, thereby starting a new count for each section.

The at least one random number generator may be specifically embodied in a single random number generator. This random number generator may generate and provide two signals. First, it may provide a single signal to determine which of a plurality of pixels to be processed simultaneously is to be corrected through a source correction pixel select signal, if more than one pixel is scaled and corrected during a single scaling and correction operation. In this case, because only one correction must occur, even though a plurality of pixels are being processed, one pixel of the plurality of pixels may be chosen for correction. For example, for two source color channel pixels processed during one scaling and correction operation, a random number generator may provide a one bit signal to determine which of the two pixels should be corrected. It is to be understood that if more than two pixels are processed during a signal scaling and correction operation, the random number generator may provide a source correction pixel select signal of the appropriate number of bits in order to determine which of a greater plurality of pixels is to be corrected, as is known.

The random number generator of an exemplary embodiment also provides a second signal which is used to determine the location of a correction along the length of a section. During initialization, an exemplary random number generator may be loaded with a mask value, which may denote the maximum bound of the section or other bound on the random number to be generated. The random number generator may receive a control signal, such as, but not limited to, an overflow as discussed above, from the accumulator of an exemplary embodiment of a section index unit at the end of a section. Upon receiving this control signal, the generator may, among other operations, increment its value, in order to provide a different index for a subsequent section. It is to be understood that a number of methods or operations may be provided in order to change the value contained in a random number generator, or any correction index unit.

Once each of the section index unit 220, correction index unit 222, and position index unit 218 have been initialized, serial color channel pixels for a single color channel may be scaled and corrected. The scaling and correcting of a single color channel may occur in substantial coordination with scaling and correcting of other color channels employing a substantially identical method.

Further, during the execution of this method, a fast scan signal or a slow scan signal, as discussed above, may be provided to delineate the spatial orientation of pixels in a color channel. For example, a fast scan signal may indicate the beginning of a line of printer image data, and a slow scan signal may delineate the beginning of a new page or image of printer image data. It is to be appreciated that source color synchronization signals though exemplified by a fast scan and slow scan signal may comprise any signal or group of signals which may define dimensional characteristics of source color channel data, as is known, or may be known.

If a fast scan signal or slow scan signal is received during the method, a scaling and correction unit may be instructed in an exemplary embodiments, to at least indicate the start of a new line, or new page, respectively.

In an exemplary embodiment, two pixels of source color channel image data are read during a single scaling and correction operation.

A determination is made as to which of the source color channel pixels are to be corrected, if a correction operation is to be made. This determination may be made by a correction index unit 222, embodied in a random number generator, portion of a random number generator, or other means.

A scaling operation is performed which may convert pixels of color channel data at a first source resolution to color channel data at a second scaled resolution. Again, color channel scaling and correction parameters may provide source color channel resolution information, and scaled color channel resolution information. From this resolution information, the scaling and correction unit may convert source color channel pixels at a source resolution to color channel pixels at a scaled resolution. In an exemplary embodiment, a source color channel resolution may be 1200 spots per inch, 2400 spots per inch, or 600 spots per inch. Additionally, a scaled resolution may include 9600 spots per inch. A scaling and correction unit may read two color channel pixels at 2400 spots per inch and scale them to eight color channel pixels at 9600 spots per inch, effectively quadrupling the resolution of the color channels pixels. Each source color channel pixel is now represented by four scaled source color channel pixels, for a total of eight scaled color channel pixels produced from two source color channel pixels.

For a correction operation, the scaling and correction unit may read a modification pixel signal from a compare index unit 216. The compare index unit 216 may, in exemplary embodiments, be a comparator or the like. The modification pixel signal may be a single bit which indicates whether or not a correction operation is to occur for the currently scaled color channel pixels. The compare index unit 216 reads a position index from a position index unit 218 and a correction index from a correction index unit 222, and may instruct a scaling and correction unit to perform a correction if the indices contained in the position index unit and correction index unit are substantially equal, via the modification pixel signal. If the compare index unit 216 indicates that the indices are not substantially equal, the scaling and correction unit 210 may output the scaled pixels to a buffer, external logic unit or units, or other device or means. If the compare index unit 216 indicates that the indices are substantially equal, the scaling and connection unit 210 may perform a correction, as discussed below.

The digital scaling and correction unit may read a number of source color scaling and correction parameters. Specifically, in an exemplary embodiment, the digital scaling and correction unit may read an addition/subtraction signal and a modification pixel signal. An addition/subtraction pixel signal may include a single bit which indicates whether or not a correction involves removing a single scaled pixel from a sequence of scaled color channel pixels, thereby contracting the scaled color channel pixels. Conversely, the addition/subtraction pixel signal may indicate that at least a single scaled color channel pixel is to be added to the sequence of scaled color channel pixels, resulting in an expanded scaled color channel pixel sequence.

Further, the correction pixel signal may indicate which of the source color channel pixels, before scaling, should be corrected by either the addition or subtraction of a scaled color channel pixel. For example, two source color channel pixels at 2400 spots per inch, converted to scaled color channel pixels at 9600 spots per inch, as discussed above, may be corrected on the first pixel or the second pixel. Specifically, if an addition correction is to occur on the first pixel, the scaling and correction unit may generate a sequence of five of the first scaled color channel pixels, followed by a sequence of four of the second scaled color channel pixels. This way, a resulting scaled and corrected sequence of color channel pixels would be nine pixels long. In addition, correction on the second pixel in the sequence of scaled color channel pixels, would result in a sequence of four of the first source color channel pixels followed by five of the second scaled color channel pixels.

A subtraction correction is executed in a similar fashion to an addition correction. In the case that a subtraction correction is performed on the first pixel of source color channel pixels at 2400 spots per inch, converted to scaled color channel pixels at 9600 spots per inch, a scaled and corrected sequence of color channel pixels would include three of the first color channel pixels, followed by four of the second color channel pixels, for a total of seven scaled color channel pixels. Similarly, a subtraction correction performed on the second source color channel pixels would result in four of the first scaled color channel pixels followed by three of the second scaled color channel pixels, again for a total of seven scaled and corrected color channel pixels.

In order to more fully illustrate addition and subtraction corrections as discussed above, an example is provided in FIG. 4.

Figure 3:
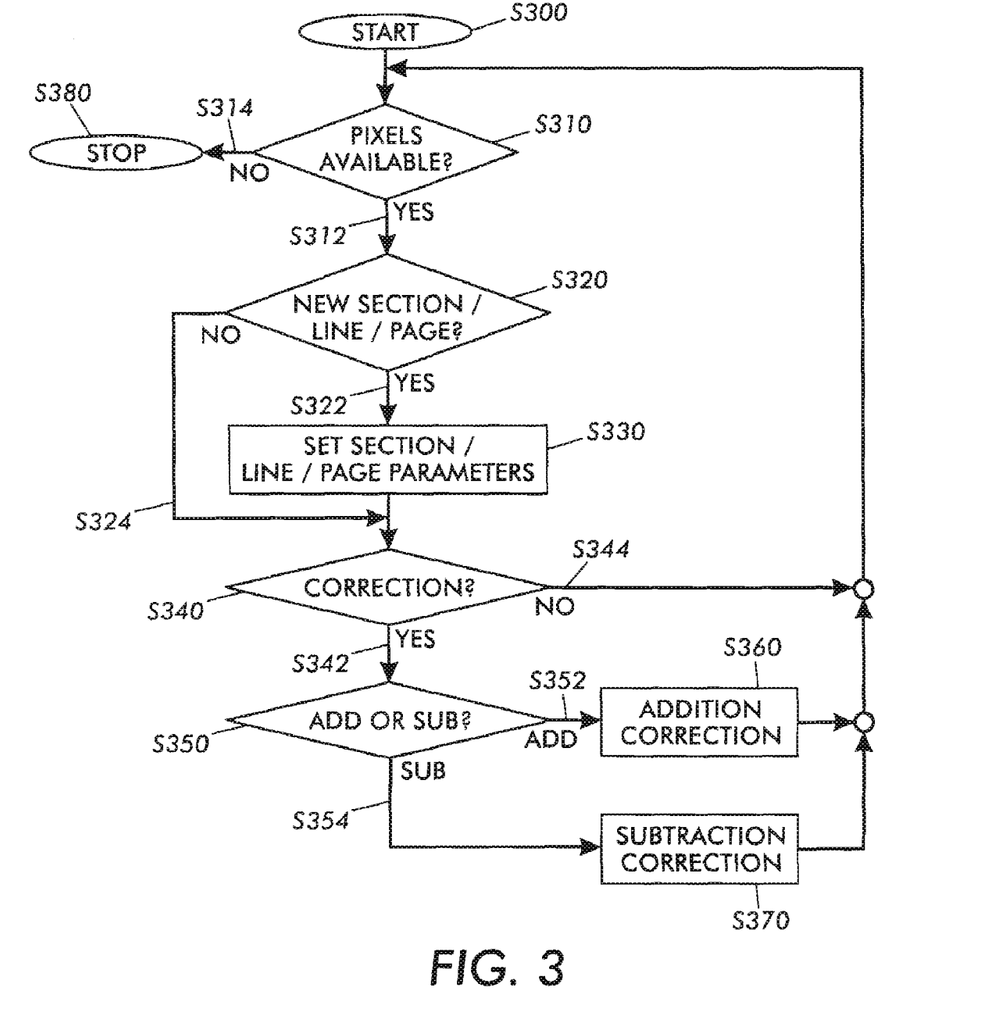
FIG. 3 is a flowchart outlining an exemplary method for implementing digital scaling and correction for a sequence of source pixels representing color channel data.

FIG. 3 is a flowchart outlining an exemplary method for implementing digital scaling and correction for a sequence of source pixels representing color channel data.

At step S300, a method for implementing digital scaling and correction for a sequence of source pixels representing color channel data begins.

A system may be initialized with parameters which may be provided by a controller interface. A controller interface 130, or another external signal, or collection of signals, may describe the parameters for scaling and correcting a particular color channel of a plurality of color channels 140 to be aligned with other color channels 140, when superimposed, in order to form a color image, as discussed above. The initialization of system parameters may occur in any order, and may comprise, in exemplary embodiments, the loading of an accumulator, the loading of a random number generator, the resetting of a counter, and the determination of an input resolution.

At step S310, a determination may be made whether pixels are available in the source color channel data for processing. If no pixels are available, the scaling and correction of all source color channel data may be complete at step S314, and the process may end at step S380. It is to be understood that other conditions, automatic, or user-initiated, from internal or external sources, may also trigger the end of a process. It is to be further understood that a digital scaling and correction process may be terminated at any point during process flow, by, for example, an abort interrupt, and is not limited to any particular position in a process. If pixels are available at step S312, the process will continue to step S320.

At step S320, a determination may be made by the system whether a new fast scan or slow scan begins, exemplified by, but not limited to a new page or a new line, respectively. A new page or line may be determined at S322, for example, by external logic interrupts or logic units, internal or external, which provides source color channel data signals. If a new section, line, page, or other division is not determined to be required at S324, the method continues to step S340. However, if such a division is required at step S322, such parameters may be indicated or set, or handled at step S330. For example, if the beginning of a new section is determined at step S324, at least the position index and the correction index may be modified. The method may then continue to step S340. If page or line start signals are delivered using interrupts, they may be delivered at substantially any time during the method, and are not necessarily restricted to step S320. An interrupt indicating the beginning of a new page or line delivered in this way may return the process to the end of step S320. If an interrupt is received, for example, after the completion of step S360, process control may return to step S320 where a new line or page may be set. Therefore, pixel orientation may be more finely controlled.

A sequence of pixels representing source color channel data may be input into digital scaling and correction system. The sequence of pixels may represent image data divided into, for example, lines and pages, and may also be read as an unbroken sequence of pixels.

A pixel or group of pixels from a sequence of pixels representing color channel data for a single color channel are read into a scaling and correction unit. During this step, an arbitrary number of pixels may be read into a scaling and correction unit for simultaneous processing, but may comprise fewer pixels than the number of pixels comprising the entire sequence of pixels representing the color channel. Because all of these pixels are processed simultaneously, only one correction may be performed during the simultaneous processing of the pixels at step S340.

A source correction pixel may be chosen from the pixel or pixels read into the scaling and correction unit. The pixel chosen may be designated as the pixel where a correction operation may occur, should a correction operation be selected for the current pixels or pixels being processed. If a correction is to occur, correction at the position of the chosen pixel using the color characteristics of the chosen pixel may occur. It is to be understood that a source pixel may be chosen at any other point during the method before correction occurs.

The source pixel or pixels may further be scaled to a second resolution. In exemplary embodiments, source pixels may be scaled from a lower resolution to a higher resolution by repeating pixels. For example, if two source pixels are read at 2400 spots per inch, and are expanded to 9600 spots per inch, a first source pixel will be duplicated four times and will be followed by four duplicates of the second source pixels. This way, eight scaled pixels at a second resolution are generated, where the first four scaled pixels have substantially identical color characteristics to the first source pixel and the second four scaled pixels have substantially identical color characteristics to the second source pixel.

At step S340, a correction determination is made as to whether a correction is to occur for t&e current pixel or pixels. A correction determination S340 may, in exemplary embodiments, comprise a comparison by the compare index unit 216 between a position index stored in a position index unit 218 and a correction index stored in a correction index unit 222. If a compare index unit 216 determines that a position index and a correction index are substantially equal, a compare index unit 216 may output a modification pixel signal to a scaling and correction main unit 214, instructing the scaling and correction main unit 214 to perform a correction in addition to scaling, at step S342. If no correction is to be made to the pixel or pixels at step S344, the scaling and correction of the pixel or pixels is complete at S344. At step S344, once scaling and correction is complete, the method may return to step S310.

At step S350, once a correction determination for a correction is made at step S342, an addition or subtraction correction determination is made, either to add a scaled pixel at S352, or to subtract a scaled pixel at S354.

At step S360, an addition correction is performed using the selected correction source pixel. A scaled pixel with substantially identical color characteristics to the correction source pixel is added adjacent to the scaled pixels created from the correction source pixel, effectively lengthening the scaled pixels by one scaled pixel. After the addition correction is complete, process flow may continue to the end of scaling and correction of the pixel or pixels, at step S310.

At step S370, a subtraction correction is performed using the selected correction source pixel. A scaled pixel from among to the scaled pixels created from the correction source pixel may be removed, effectively shortening the scaled pixels by one scaled pixel. After the addition correction is complete, process flow may continue to the end of scaling and correction of the pixel or pixels, at step S310.

Once the subset of pixels have been processed during scaling and correction, the pixels may be output to external logic unit or units for further processing or display. As discussed above, further processing may include, in exemplary embodiments, buffering or parallel to serial conversion.

At least the position index stored in a position index unit 218 arid section index stored in a section index unit 220 may be updated, to indicate at least the position index of a subsequent pixel or plurality of pixels to be scaled and corrected. Additionally, the section index may be updated, and such an update may include a control signal indicate whether or not a new section is to begin. For example, a section index unit 220 may comprise an accumulator, and each update may comprise adding a value to the section index accumulator. When a value is added to the section index accumulator which causes an overflow, the overflow may indicate the beginning of a new section.

Indices may be updated in accordance with the start of a new section. In exemplary embodiments, a position index may be reset to zero, indicating a new measurement from the start of a new section. Additionally, the correction index may be updated to set a different index from the index used in a previous section, to further randomize distribution of errors. The update of a correction index may include, but is not limited to, an increment or decrement of a correction index, or the random generation of all or part of a correction index, based on random number generator input parameters as are known, or may be known.

Figure 4:
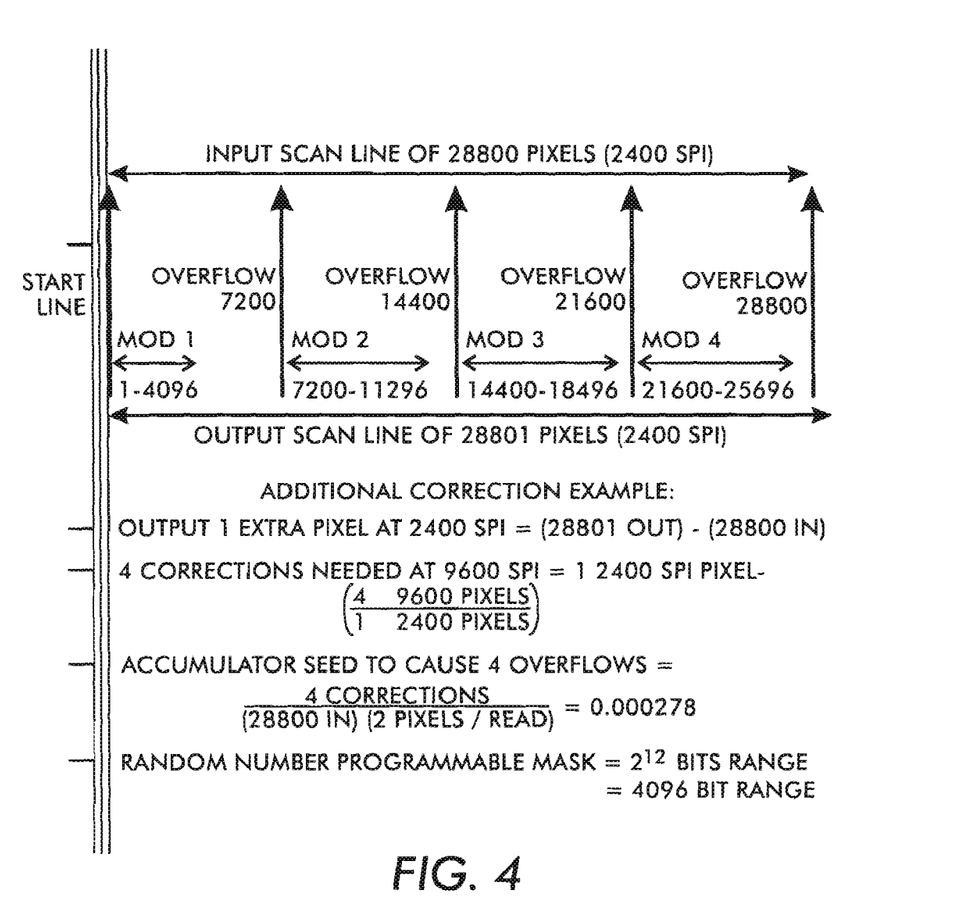
FIG. 4 illustrates a diagram of an exemplary output of a digital scaling and correction system involving addition corrections.

FIG. 4 illustrates a diagram of an exemplary output of a digital scaling and correction system involving addition corrections.

An exemplary output of a digital scaling and correction system 600 is provided. This exemplary output shows the output characteristics of scaling and correction of source color channel pixels in a single scan direction. In this example, a single scan direction may include a single line of printer data output for a single color channel.

An input scan line 610 comprising a sequence of 28,800 pixels at 2400 spots per inch is to be corrected to an output scan line 620 comprising a sequence of 28,801 pixels at 2400 spots per inch ("spi"). At 2400 spots per inch, 28,800 pixels equal substantially twelve inches. A determination is made externally that a correction should comprise an output correction of one extra pixel at 2400 spots per inch 660. In this example, a scaling and correction system may scale pixels at 2400 spots per inch to pixels at 9600 spots per inch. Though the internal scaling of pixels may change, the output characteristics of the image will not be substantially different, due to the duplication of pixels to preserve output size, as discussed above.

With a scaled resolution of 9600 spots per inch, a single addition correction at 2400 spi must be expanded to four addition corrections at 9600 spi, where 4 9600 spi correction pixels=(1 2400 spi correction pixel)*(4 9600 spi pixels/1 2400 spi pixel) 670. Since a single pixel at 2400 spi has been divided into four pixels at 9600 spi, the addition of a single pixel may be distributed across substantially the entire scan line.

Since once correction occurs in each section of a scan line, as discussed above, four sections must be provided in order to execute the required number of corrections. In this exemplary embodiment, a section index unit 210 is embodied by an accumulator which loads a seed value. This seed value may be added to itself in the accumulator during the scaling and correction of each pixel or set of pixels. Here, two pixels are read during each scaling and correction operation. An accumulator is provided that may return information in decimal form, and may overflow on reaching a value of 1. A fractional value may be retained in the accumulator during the following accumulator addition of the seed value 5410. In this case, the accumulator seed value 680 required to create four sections, and therefore execute the required four corrections, is 0.000278, where the seed value may be 0.000278=(4 corrections)/([(28,800 source pixels)*(2 pixels per scaling and correction operation)]. It is notable that the accumulator seed value determination also includes a division by the number of pixels simultaneously processed by the scaling and correction unit. Once scaling and correction begins at the start of a line 630, each overflow of the accumulator will determine the edge of a new section 640A, 640B, 640C, and 640D, beginning at 7200 pixels, 14,400 pixels, 21,600 pixels, and 28,800 pixels from the beginning of a line at 2400 spi, respectively.

Additionally, an exemplary correction index unit 220, in this case a random number generator, may be programmed with a mask value which determines the allowed range of a correction within a section. In this case, a mask may be programmed at element 690 with a twelve-bit number, allowing a 4096 pixel range, where 2^12=4096. It is notable that in this case, the length in pixels of a region where a correction may occur, 4096 pixels from the beginning of a section, is smaller than the length in pixels of a section, 7200 pixels from the beginning of the previous section.

Once these parameters have been defined, a scaling and correction process for a line of source color channel data may begin as shown in, but not limited to, the above example.

Further, the above example may be repeated for a plurality of lines comprising a page, and still further for a plurality of such pages, as discussed above.

It is to be appreciated that, even though the above example includes a source resolution of 2400 spots per inch, the scaling and correction unit may receive source color channel pixels of any predetermined desired resolution, including 600 spots per inch and 1200 spots per inch.

It is also to be appreciated that even though the above example scales pixels to 9600 spots per inch, the scaling and correction unit may produce scaled color channel pixels at any predetermined desired resolution.

It is further to be appreciated that even though the above example includes two source color channel pixels to be read during a single scaling and correction operation, and a choice among the two color channel pixels for correction is made, the scaling and correction unit may read any number of predetermined desired source color channel pixels, and choose from among any number of predetermined desired source color channel pixels 5332.

Now the digital scaling and correction system 5000 may output a scaled sequence of color channel pixels 5132, or if a correction is required, a scaled and corrected sequence of color channel pixels 5132. These scaled, or scaled and corrected, sequences of color channel pixels may be combined with other sequences of color channel pixels, as discussed above.

It will be appreciated that various of the above-disclosed and other features and functions, or alternatives thereof; may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A system for digital correction for alignment of a plurality of color channels, comprising:

a plurality of active scaling and correction units, each scaling and correction scaling and correcting source color channel pixels of a single source color channel and generating scaled and corrected color channel pixels according to a common timing signals;

a controller interface to provide independent scaling and correcting parameters to each of the active scaling and correction units; and a single timing clock, operatively connected to wherein—the plurality of scaling and correction units, the single timing clock producing the common timing signal that synchronizes the generating of the scaled and corrected color channel pixels by the plurality of active scaling and correction units.

2. The system according to claim 1, further comprising:

a synchronization unit comprising a timing signal generator, wherein the timing signal generator generates synchronized timing signals that are operatively supplied to the plurality of active scaling and correction units.

3. The system according to claim 2, wherein the synchronization unit further comprises a plurality of output registers to buffer data regarding the scaled and corrected color channel pixels to synchronize outputs of the plurality of active scaling and correction units according to the common timing signal.

4. The system according to claim 3, the synchronization unit further comprising:

a plurality of parallel to serial converters, each corresponding to one of the plurality of scaling and correction units, that convert the data regarding the scaled and corrected color channel pixels to serial scaled and corrected color chanel pixels prior to output, wherein the plurality of output registers provide the plurality of parallel to serial converters with buffered scaled and corrected color channel pixels.

* * * * *

UNITED STATES PATENT AND TRADEMARK OFFICE
CERTIFICATE OF CORRECTION

PATENT NO. : 7,852,531 B2
APPLICATION NO. : 11/954841
DATED : December 14, 2010
INVENTOR(S) : Aron Nacman et al.

Page 1 of 1

It is certified that error appears in the above-identified patent and that said Letters Patent is hereby corrected as shown below:

On the cover page, item (75) Inventors. Please amend the address of the second inventor as shown below:

change: "John Adam Handwork, Calcleamas, OR (US)"
    to: --John Adam Handwork, Clackamas, OR (US)--

Signed and Sealed this
Tenth Day of May, 2011

David J. Kappos
*Director of the United States Patent and Trademark Office*